June 17, 1941. W. J. HUGHES 2,245,587
LIQUID TREATING APPARATUS
Filed June 5, 1936 2 Sheets-Sheet 1

Inventor:
Walter J. Hughes,
By Cromwell, Treist & Warden
attys.

June 17, 1941.  W. J. HUGHES  2,245,587

LIQUID TREATING APPARATUS

Filed June 5, 1936  2 Sheets-Sheet 2

Inventor:
Walter J. Hughes,
By Cromwell, Greist, Warden
attys

Patented June 17, 1941

2,245,587

UNITED STATES PATENT OFFICE 2,245,587

LIQUID TREATING APPARATUS

Walter J. Hughes, Chicago, Ill., assignor, by mesne assignments, to Infilco Inc., a corporation of Delaware Application June 5, 1936, Serial No. 83,662

24 Claims. (Cl. 210—16)

The present invention relates to the treatment of liquids and has particular reference to an improved method and apparatus for the treatment of liquids to remove undesirable substances therefrom or to separate a mixture of a liquid and solids into component parts.

A principal object of the invention is the softening of water by treatment of raw water with a precipitate-forming reagent in a dense slurry of previously formed precipitate to effect the softening reaction in the presence of the previously formed precipitate in such a manner as to permit of rapid and effective clarification of the water.

Another object is the provision of a process and apparatus for the purification of water involving the maintenance of a thick slurry consisting of suspended solids previously precipitated from water and utilization of a zone of such slurry in the separation of solids from water without sedimentation.

An additional object of the invention is the provision of improved process and apparatus for removing substances from liquids in solid form, the process involving maintenance of a concentrated slurry of suspended particles precipitated from previously treated liquid and held in suspension by agitation, and providing with the slurry a pattern of circulation in which slurry is convergently drawn into and passed through a mixing zone in admixture with liquid undergoing treatment and then is divergently distributed in the slurry zone, a portion of the divergent discharge from the mixing zone being displaced upwardly for clarification purposes.

Another object is the provision of a process and apparatus for removing substances from liquids in solid form in which a slurry zone containing suspended particles separated from previously treated liquid is established in a body of the liquid and there is established with the slurry a circulation pattern in which converging portions of the slurry are projected in a stream through a mixing zone by a rotating stream-projecting impeller in admixture with water undergoing treatment with a precipitate-forming reactant, the slurry from the mixing zone being distributed divergently in the slurry zone, and treated liquid being displaced from the slurry zone.

A further object of the invention is the treatment of aqueous liquids with a precipitate-forming substance and removal of the resulting suspended solids from the water by a process and relatively small, simple and compact apparatus which produce the results desired effectively and in a short period of time.

A still further object of the invention is the provision of a method and apparatus for stabilization of solutions with respect to a precipitatable solid dissolved therein and whereby metastable or unstable equilibrium solutions may be upset to bring about stabilization of the solutions, thus avoiding subsequent deposition of the solid phase.

These and other objects will be apparent from a consideration of the following specification and by reference to the accompanying drawings, in which Fig. 1 is a vertical sectional view of an apparatus suitable for carrying out my improved method taken along line 1—1 of Fig. 2;

In many industrial and municipal processes it is necessary to remove solids from various aqueous liquids. Ordinarily, the filtration or sedimentation steps commonly employed for removing these suspended solids are preceded by chemical treatments in which the liquids have added thereto floc or sediment-forming chemicals. One of the most common processes of this type is the treatment of raw water for softening purposes. The water customarily is subjected to one of the several well known processes such as the lime-soda process for precipitation of hardness-causing impurities, the chemicals added to the water and the impurities therein reacting to form more or less flocculent precipitates. These suspended solids then are removed by sedimentation and filtration. As the softening and clarification of water affords a good example of this type of process, the present invention will be described with particular reference thereto, although it is to be understood that my improved process and apparatus are applicable to other uses.

Figure 1:
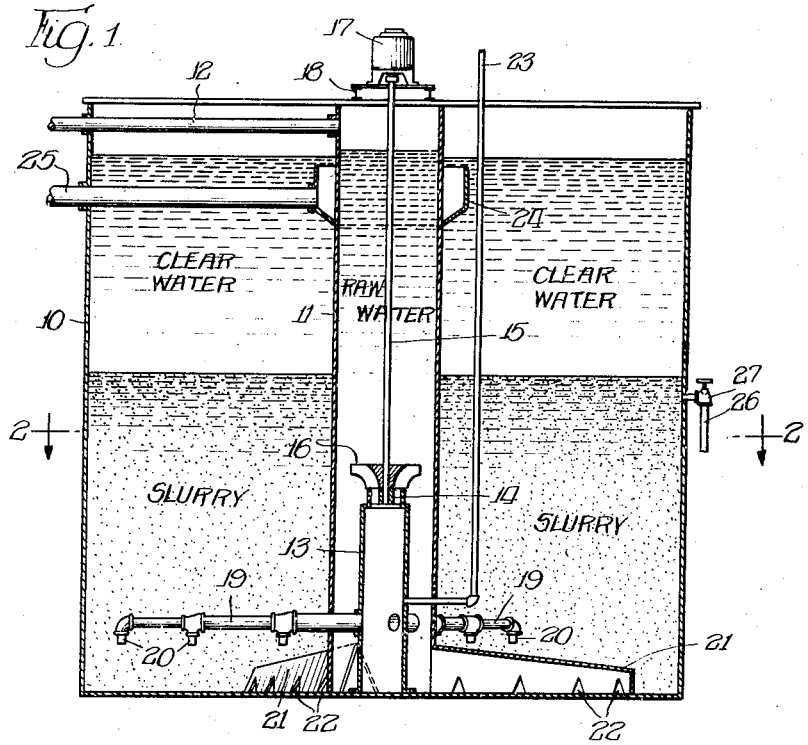
Figure 2:
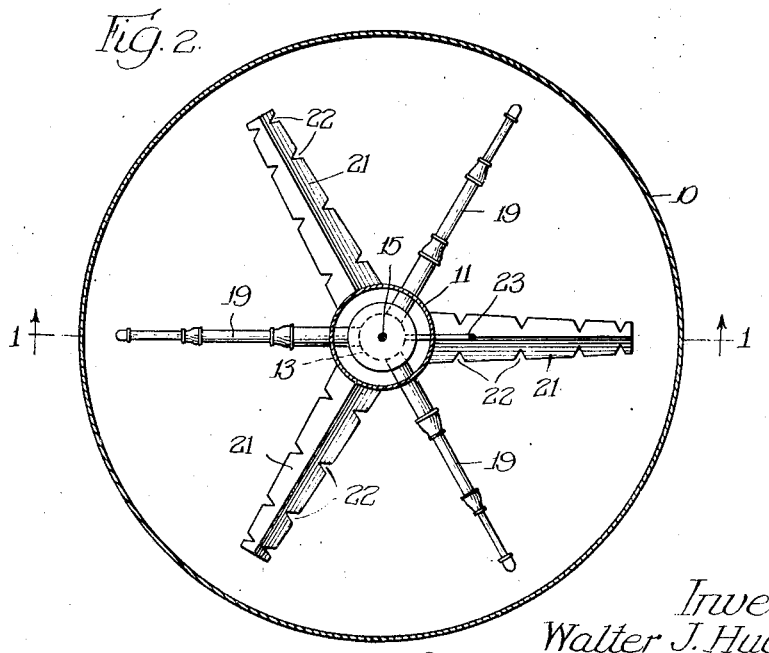
Fig. 2 is a horizontal sectional view taken along line 2—2 of Fig. 1.

As shown in Figs. 1 and 2 of the drawings, the apparatus includes a vertical tank 10 which is shown as being of uniform circular cross-section. Extending upwardly through the center of the tank is a cylindrical treating chamber 11 consisting of an open casing which connects adjacent the top of the tank with a raw water inlet pipe 12. The treating chamber 11 may open to the atmosphere at its top and preferably is of sufficient size to carry the incoming raw water downwardly at a velocity sufficiently low to allow for the upward rise and escape of air or gas.

Resting on the bottom of the tank within the treating chamber 11 is a cylindrical return or collecting chamber 13 which also consists of an open casing concentric with the casing 11. The upper end of the collecting chamber carries a spider bearing 14 in which is journaled a shaft 15. Shaft 15 carries a centrifugal stream-projecting impeller 16 on its lower end and is driven by a motor 17 carried on frame structures 18 at the top of the tank. Rotation of the impeller 16 causes a downward current or stream within the treating chamber 11. Extending outwardly from the collecting chamber 13 are a series of collecting lines 19 having spaced pick-up openings 20 which are positioned a few inches above the bottom of the tank. It is preferred that the pick-up openings 20 be spaced in such a manner as to collect liquid evenly from the various parts of the tank and to provide converging streams of liquid to the collecting chamber 13.

Communicating with the bottom of the treating chamber 11 are a series of diverging inverted V-shaped discharge conduits 21, which are provided with discharge slots 22. The slots 22 are spaced in the same manner as described in connection with the openings 20 so as to produce an even discharge of liquid in the various parts of the bottom of the tank.

To provide for chemical treatment, a line 23 leads from outside the tank to the collecting chamber 13. Adjacent the top of the tank is mounted an outlet overflow funnel 24 which surrounds and is supported by the chamber 11. An outlet conduit 25 conveys water from this funnel to the points of use. Preferably, the top edge of the funnel 24 is as near level as possible, so as to take water evenly from the various portions of the tank. A plurality of properly located collection funnels may be found desirable particularly where the tank is large.

A slurry discharge pipe 26 provided with valve 27 is mounted in the side of the tank 10 at an elevation below the top of funnel 24 and well above the bottom of the tank.

An initial stage of the operation includes the establishment in the lower portion of the tank of a pool of thick slurry composed of particles of a like nature to the solids to be precipitated from the raw water. This slurry which is produced during the initial stage of the process and thereafter maintained during operation consists of liquid with solid particles prepared and conditioned as described more particularly hereinafter in a manner characteristic of this process. Thereafter, raw water to be treated is subjected to a reactant in admixture with circulated slurry and then is percolated upwardly through the slurry to remove the resulting precipitate, clear water being removed from above the pool.

After the tank is filled with water to a level above the impeller 16, the latter is rotated to establish a circulation which includes the pick-up of liquid by the radial collector pipes 19 from spaced points adjacent the bottom of the tank, the collector pipes 19 discharging liquid into the common collector chamber 13 from which the liquid flows upwardly and into the treating chamber 11 adjacent the impeller. As the return water is discharged from the collector chamber 13 it is mixed with the raw water passing downwardly within the treating chamber. The resulting mixture passes downwardly and outwardly through openings 22. Chemicals with which it is desired to treat the raw water are preferably mixed with the return liquid prior to mixture of the latter with raw water to be treated.

As the chemicals react with the water a precipitate is formed in an amount which depends upon the chemical treatment and the amount of impurities in the water. In the softening of water the hardness-imparting constituents are precipitated by treatment with well known chemicals. The water containing the precipitated materials passes into the tank at the bottom thereof through openings 22 and is displaced upwardly in the tank. A considerable portion of this water and precipitate is drawn back into collector chamber 13 through pick-up pipes 19. In the collector chamber 13 the water carrying the previously precipitated solids is dosed with chemicals from pipe 23 and thereafter passes into the treating chamber where raw water to be treated is mixed with the dosed water which is returned and the chemicals react with impurities in the raw water in the presence of the previously formed precipitate. As the process continues the amount of solids in the water increases and the lower portion of the tank becomes filled with a heavy slurry consisting of suspended particles of the solids precipitated from the water. It is this thick slurry which is picked up and returned to the collection chamber by pipes 19 and the reaction which takes place when the dosed slurry is mixed with the raw water is effected in the presence of a large quantity of previously formed particles. Apparently, a considerable portion of the solid products of reaction form deposits directly upon the previously formed particles contained in the circulated slurry. That is, it appears that a large portion of the molecules of the precipitate form as such directly upon the previously formed particles instead of forming separate small particles and by this process of accretion the particles in the slurry which is returned to the reaction zone are built up to a size which facilitates clarification in the manner to be described hereinafter. By reason of this building up of previous particles, the number of new particles formed is relatively small and there is not obtained the usual large number of minute particles characteristic of ordinary treatment. The dosed slurry first meets the raw water out of contact with the impeller and the latter is protected against the deposition thereon of freshly formed precipitate which would occur otherwise. In view of the large surface area provided in the reaction zone by the returned particles any deposit which may be formed upon the equipment is relatively small and occurs in such localities as not materially to interfere with the efficiency of the operation.

In softening a hard water, the amount of slurry circulated through pick-up pipes 19 preferably is of the order of twice the amount of raw water entering the process. Thus, a volume of slurry equal to two-thirds of the flow discharged through openings 22 will be picked up by pipes 19. An amount equal to the volume of raw water being treated will be distributed divergently within the slurry zone in the lower portion of the tank and pass upwardly in a uniform vertical movement through the upper zone of slurry in the tank. All but a small portion of the water passing upwardly in the tank is drawn off from the upper portion of the tank through collector funnel 24. During the initial period of operation or establishment of a pool of slurry in the lower portion of the tank, the clarity of the water received by the overflow funnel 24 will depend largely upon the concentration of solids in the slurry. As the concentration of solids in the slurry pool increases the separation of solids from the water becomes more efficient until a concentration or condition is reached at which a clear water is obtained and the upper level of the slurry will be rather well defined. The solids accumulate in the slurry pool until a limit is reached beyond which there is no further increase under the particular conditions of the process. That is, for any given set of process conditions there will be a particular slurry concentration which finally is reached. The process conditions having a bearing on this maximum concentration include the rate of upward flow of water, the amount and nature of impurities removed from the water, the chemical treatment by which they are formed, and the temperature of the process. Other process factors likewise may have a bearing upon the solids concentration of the slurry. After the slurry pool has reached this state of physical saturation with respect to the amount of particles, change in any of the process conditions will result in a corresponding change in solids concentration.

The change which occurs upon the formation of the definite zone of slurry marks the completion of the initial stage of the process. During the formation of the definite slurry zone fewer and fewer of the solid particles escape to rise with the water, and the effluent becomes clearer. The tanks employed in the process are too small to permit clarification by sedimentation at the rate of flows used, and the slurry lies in the bottom of the tank like a heavy liquid having a definite upper level. As additional treated water is passed into and through the slurry, the liquid medium which supports the particles changes constantly, while additional solids are added to the slurry pool.

It will be noted that the liquid issuing from openings 22 sweeps across the bottom of the tank, thereby establishing in the lower part of the slurry pool a circulation zone. The agitation incident to this circulation of liquid and the upward rise of water through the slurry maintain the particles in the slurry pool in suspension. Thus, there is established by the action of the stream-projecting impeller a pattern of circulation in which converging portions of slurry are drawn into the central mixing zone through arms 19 and in which, after passing through the mixing stream with raw water and softening chemicals, the slurry is divergently distributed in the slurry zone through the members 21, treated water being displaced upwardly from the slurry. The upper or clarification zone in the slurry pool preferably is relatively quiescent to facilitate the even upward rise of water therethrough and to provide a substantially uniform distribution of suspended particles. As treated water passes upwardly through the slurry, the particles contained in the water separate therefrom and become part of the slurry, the resulting clear water being collected above the upper layer of the slurry pool. Separation of the particles in this manner is facilitated by the built-up structure which is imparted to them in the reaction zone. The large particles formed by accretion are readily separated from the water in the slurry pool and where so separated appear to act in the manner of a filter or trap with respect to other particles, thereby effecting separation of smaller particles which might otherwise be carried out with the water. The slurry pool also affords an opportunity for the particles to adhere together or agglomerate subsequent to their formation, and this action likewise assists in separation of the particles from the treated water.

The concentric casings 11 and 13 and their communicating slurry transfer members 21 and 19, respectively, constitute slurry guide means by which slurry is circulated upon rotation of the stream-projecting impeller from various parts of the pool thereof maintained in the lower portion of the tank convergently to and through the chemical treatment or mixing zone where the softening chemicals are mixed with the hard water and divergently from the mixing zone back into the pool of slurry. The circulatory and suspensory effect of the impeller is sufficient to circulate through the mixing zone a greater quantity of slurry than the hard water introduced into the process and to maintain the particles of the slurry in suspension. The liquid guide members confine the circulatory effect well below the liquid outlet 24 to provide a zone of relative quiescence above the circulation zone for clarification without sedimentation.

The upper level of the slurry pool is maintained at the desired elevation, preferably well below the take-off funnel, by withdrawing a small side stream of slurry through the blow-off line 26. If the amount of solids withdrawn through this blow-off is smaller than the amount of solids separated from the water being treated, the upper level of the slurry pool will rise. Conversely, withdrawal of a greater amount of solids through the blow-off than is separated from the water passing through the slurry pool will result in a fall of the upper level of the slurry pool.

It is preferred to withdraw the slurry to be discharged from adjacent the top of the slurry pool. In such a take-off the particles have a slow and general movement upwardly as additional solids are added at the lower part of the slurry and equivalent solids are withdrawn from the slurry pool near its top. The concentration of the solids throughout the slurry generally is nearly uniform. Lighter particles tend to accumulate at the top of the pool and such particles are of less value as slurry and have a tendency to be carried out with the treated water. Consequently, draw-off of such particles assists in maintaining the pool of slurry in good condition. While a large proportion of the solids precipitated from the raw water in the reaction zone appear to be deposited directly upon previously formed particles, there are sufficient new particles formed to replace those withdrawn from the process through the slurry blow-off.

In the softening of many waters by treatment with hydrated lime and soda ash, it will be found desirable to provide a vertical rise of water within the tank of the order of 1.6 inches per minute, corresponding to a flow of one gallon per minute per square foot of cross-sectional area of the tank. In the case of a flow of 150 gallons per minute, the area of the tank therefore will be about 150 square feet. This area is provided by a tank of about 14 feet diameter. The impeller may be rotated at a speed which will provide a circulation of about 300 gallons per minute. As the flow of water to be treated is 150 gallons per minute, it will be seen that approximately two volumes of slurry are mixed with one volume of raw water to be treated. This ratio may be changed to a greater or lesser one to best suit any particular type of liquid and the kind of treatment to be applied. This circulation of a large proportion of slurry aids in the distribution of the liquid over the tank area and provides for the softening reaction in the presence of a large quantity of previously precipitated particles. Additionally, where the process is stopped temporarily and the solids in the slurry pool settle in the tank, the circulation of a large proportion of slurry upon resumption of the operation aids in quickly re-establishing the slurry pool without the necessity of building the solids up to the maximum concentration by accumulation.

In the specific example given, the depth of the circulating space from the floor of the tank to the pick-up openings of the collector pipes may be about ten inches. The depth of the slurry above this space during operation in this example may be about fifty inches, the top of the slurry being about at the sixty inch level where the slurry discharge conduit 26 is placed. By proper arrangement of the take-off so that the slurry pool is not disturbed by uneven upward or horizontal currents, the take-off funnel may be located twenty-four inches above the conduit 26. Thus, the total working depth from bottom of tank to edge of take-off funnel may be of the order of eighty-four inches. The eighty-four inches of working depth in this example in which the free rising rate of the liquid is 1.6 inches per minute represents a total time for the process of but fifty-two and one-half minutes. Of this time, the water is in retention during its passage upwardly through the slurry only a little over thirty minutes. Actually, however, since the particles may occupy some twenty-five per cent of the space, the real velocity is one-third greater than the free velocity so that the contact time is only a little over twenty minutes. In this example, therefore, the holding capacity of the tank up to the take-off funnel for treating nine thousand gallons per hour is but 8750 gallons. The specified dimensions are given by way of example only and considerable variation is permissible. For instance, good results have been obtained with slurry depths of under 24 inches. Ordinarily, and particularly in the case of tanks of larger diameter, a deeper pool of slurry facilitates circulation and distribution.

Considerable variation in the rate of upward rise of water through the slurry pool is possible. The particular rate chosen may depend upon such factors as the nature and amount of impurities in the water to be treated, the temperature of treatment, and the results desired from the standpoints of quantity and quality of treated water. Good results may be obtained in the softening of water by a cold process involving an upward rate of rise of the order of one-third to six inches per minute. Where the invention is utilized in connection with a coagulation process, the upward rate of rise may be of the order of one-third to eight inches per minute.

When Lake Michigan water having a hardness of about 125 parts per million as calcium carbonate is subjected to treatment as described, an upward rate of rise of one gallon per minute per square foot being employed, a slurry pool having a depth of some fifty inches and containing approximately 2,000 grains per gallon (about 3½ per cent solids by weight) will result in a reduction of the hardness to about 18 parts per million even when the temperature is as low as 2° to 5° C. Also, when Lake Michigan water is artificially hardened to 340 parts per million by adding soluble calcium and magnesium salts, substantially the same results may be obtained.

Any very hard water, of course, will form slurry faster than a softer one. Thus, since the slurry forms faster with one water than it does with another, there must be a compensating increase in rate of slurry elimination in order to keep the retained amount in control. The control of the amount of slurry by means of the conduit 26 and the valve 27 is readily accomplished. To explain this control as applied to the apparatus taken for the illustration above, it may be assumed that one water produces slurry at the rate of ten grains per each gallon softened, whereas another one produces slurry at the rate of twenty grains per each gallon softened. In either case under the conditions of the illustration, the slurry may be concentrated to the order of about 2,000 grains per gallon. Each gallon withdrawn through conduit 26 will carry out about 2,000 grains. In the case of the ten grain water, 200 gallons may be softened for each one gallon of slurry discharged, and in the case of the twenty grain water 100 gallons may be softened for each one gallon of slurry discharged. Thus, the loss of softened water in the two cases is but one-half and one per cent respectively or when applied to the 150 gallon per minute apparatus of the illustration above the rates of slurry discharge are three-quarters and one and one-half gallons per minute respectively for the two waters. These small streams of waste flow are readily adjusted by use of the valve 27 in the outlet line 26 and do not require unusual or special disposal facilities such as are necessary with apparatus which provides for eliminating intermittently the sludge deposited by sedimentation upon the bottoms of settling tanks or in bottom sumps.

The size of the chamber 11 may be such as to provide space wherein a thorough mixing of the liquid to be treated and the returned slurry may take place and wherein the resulting chemical reaction may be completed in the desired time. The slurry is circulated and the thorough mixing is secured by the use of a slowly revolving impeller 16. Preferably, the reaction takes place entirely within the chamber 11 or within this chamber and arms 21. Large passages are provided for the returning and discharging flows of the circulation so that velocities may be held down to avoid unnecessary break-up of the slurry particles and reduce friction losses to a minimum.

Usually the total head required for the circulation, as described herein, is only of the order of about three inches of water head. In the case of the example in which 300 gallons per minute are circulated, the impeller 16 may have a diameter of about 18 inches and may have straight, radial or 90° vanes with passages that will not induce velocities of much more than two to two and one-half feet per second. The peripheral velocity of the impeller needed to create the flow head of about three inches is about four feet per second so that it need be driven at only about fifty revolutions per minute. The water horse power required for the circulation in this illustration is very small, being only 0.073. The actual power requirements are therefore insignificant.

One value of the process lies in the stability of the treated water with respect to depositing additional precipitate on standing, or conversely with respect to the water taking up additional solid matter on contact therewith. Thus, in ordinary water softening operation it is customary to allow 4 to 6 hours for stabilization and settling. Due in part at least to the dense slurry used and to the carrying out of the process within the volume of a slurry bath as described, these results are obtained relatively quickly. Because of this the process may be employed to effect stabilization of water without chemical treatment thereof. Many waters are unstable with respect to the dissolved calcium carbonate content thereof. In some cases there is supersaturation in this respect so that the water deposits lime on surfaces it contacts, thereby clogging pipes through which it passes. In other cases the water is undersaturated and tends to dissolve additional calcium carbonate. A water of the latter class prevents the slight deposit or film of lime on the surface of pipes that is desirable because its presence protects the pipes from corrosion. When such a protective film is absent there will ordinarily be some corrosion of the pipe and the water will take up some iron, which is objectionable. Such an undersaturated water is commonly spoken of as an aggressive water and in many places such waters are treated in some way, as by addition of a small amount of hydrated lime in the form of milk of lime, to overcome this trouble. Many municipal supplies are so treated.

Waters of either kind may be stabilized in accordance with the present invention. In such cases a slurry bath composed of or containing finely divided calcium carbonate is provided and the water passed into and through it in the way above referred to. If the water is supersaturated with calcium carbonate the excess will tend to deposit on or with the particles it contacts while if the water is unsaturated there will be some solution. In the former case the slurry will be built up and the excess must be disposed of while in the latter case there must be replacement which may be either continuous or periodic.

In such ways the calcium carbonate content of the water may be stabilized at any desired point within the limits of solubility. In fact, it is possible to soften a hard water in this way when the hardness is of the kind known as temporary hardness due to the presence of calcium carbonate, without application of chemical reagents and purely by physical means, and to stabilize the water at the desired point.

In carrying out such a treating or softening process the point of stability or degree of softening may be as desired within theoretical limits of solubility, by mechanical removal of dissolved carbon dioxide from the water by any suitable method as for instance aeration. While calcium carbonate is soluble as such in water to the extent of roughly 15 parts per million, it will dissolve as bicarbonate to the extent of several hundred parts per million, but a water containing calcium bicarbonate is not stable with respect thereto unless there is also present some excess carbon dioxide in the form of dissolved or free carbon dioxide. If, therefore, this excess be taken out of the water the equilibrium will be upset and will be restored only at a lower calcium carbonate content. Ordinarily the separation in solid form and the removal by sedimentation of the surplus of calcium carbonate is a very slow process requiring perhaps several hours if the water is cold, but with my process I can bring it about within a few minutes, as spoken of above. Thus, it is possible quickly to soften in the cold a hard water of the type referred to by what may be called purely mechanical means as contrasted with a chemical dosage as is ordinarily used.

The removal of the carbon dioxide may be accomplished by passing the water over an aerator, such apparatus being capable of removing all the free carbon dioxide and even some of the half bound. The water may be then passed through a slurry bath in a suitable apparatus whereupon the excess of calcium carbonate will quickly separate and equilibrium at a lower content established. At this point there will again be some free carbon dioxide and the water may be again aerated to remove this and again passed through a slurry bath to reach a still lower level of calcium content. Such a process may be carried out in several separated stages in series, each subsequent step being at a lower equilibrium level. It is possible, however, to carry it out in one apparatus having a single slurry bath by a continuous circulation of water out of the apparatus over an aerator and back into the slurry, as each passage over the aerator will remove some carbon dioxide and each passage through the bath will tend to stabilize with release of more carbon dioxide. Thus, there may be a continuous flow of hard water into such an apparatus and a continuous treatment thereof and escape as softened water. In this way, in actual practice, the calcium carbonate of a water has been reduced from an initial content of about 550 parts per million to about 140 parts per million in a one-stage apparatus having a supplementary circulation and aeration as referred to above. Oil field brines have been purified so that they may be reused in "flooding" operations in which the water is pumped into the oil-bearing sand to dislodge and displace the oil, without deposit taking place in the formation or in the pipes and other parts with which the water comes in contact. Also, some brines may be undersaturated and in such instances stabilization may be effected by addition of substances which will complete the saturation and prevent subsequent damage which otherwise would be incurred by reaction of the undersaturated brines with metallic parts of equipment contacted by the brine. Similarly, stabilization of supersaturated or undersaturated disposal waters or brines may be effected by treatment as described. In the treatment of brines, in general the density of the slurry increases with the density of the brine. That is, the slurry will be heavier with a heavy brine than in the case of a light brine or water. Possibly, this is due to a dehydrating effect upon the slurry by the salt.

In a great many cases no special precaution need be taken as to the character of the bath of slurry beyond maintaining the proper volume thereof, but the water or other liquid may be dosed with reagent just as in ordinary practice and the above described process carried out. There may be a dearth of slurry at first but this will accumulate from the treatment and later disposal will be necessary. In some cases it will be necessary or advantageous to control the character of the slurry to some extent as by having present therein some coagulating or flocculating medium such as aluminum hydrate, or by controlling the character of the liquid being treated, say as to its pH value. Such control may not be necessary to insure proper results but may enable results to be had more rapidly so that a larger flow may be put through a smaller apparatus.

Figure 3:
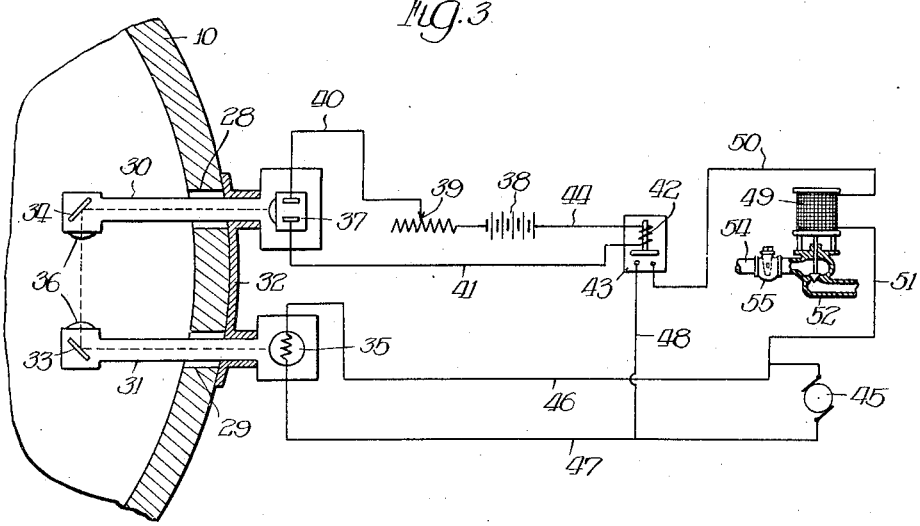
Fig. 3 is a more or less diagrammatic view showing means for regulating the amount of accumulated precipitate suspended in the apparatus shown in Figs. 1 and 2.

The mechanism shown in Fig. 3 is operable automatically to regulate the zone of increased solids content. Extending through openings 28 and 29 of tank 10 adjacent the upper level of the zone of increased solids content are the tubes 30 and 31, respectively. These tubes may be attached to an outside bracket 32 which is adapted to be secured to the tank. Tube 31 is provided with a mirror 33 and tube 30 has a similar and oppositely positioned mirror 34.

By means of mirror 33 tube 31 transmits light from an outside lamp 35 through lenses 36 adjacent mirrors 33 and 34 and to a photoelectrical cell 37 which is housed outside tank 10. The tubes may be so positioned that the zone of increased solids content will cut off light passing between mirrors 33 and 34. If the zone of increased solids content is lower than the level of the tubes, the light will pass through clear water to activate the photoelectric cell 37. When so activated, this cell will close the circuit from a source 38 of low voltage energy through adjustable resistances 39, line 40, cell 37, line 41, coil 42 of relay 43 and line 44. The normally closed relay 43, the coil of which is energized by current through the circuit described, is held in open position. Current for the lamp 35 is taken from a high voltage source 45 through lines 46 and 47. Line 48 is connected between line 47 and one terminal of the relay 43. One terminal of solenoid 49 is connected to the other terminal of relay 43 by means of line 50. The other terminal of solenoid 49 is connected to line 46 by means of line 51. When the circuit through solenoid 49 is broken at relay 43, the solenoid acts to close valve 52, the latter being connected to the side of the tank 10 below tubes 30 and 31 by means of pipe 54. Desirably, a cock 55 controls the withdrawal of suspended solids.

When the zone of increased solids content rises sufficient to cut off the light between mirrors 33 and 34 the photoelectric cell 37 de-energizes relay 43, and the switch of the latter closes the contacts between lines 48 and 50. This latter action results in a closed circuit through solenoid 49 from source of current 45, the core of solenoid 49 opening valve 52 and allowing for withdrawal of liquid from the zone of increased solids content. Withdrawal of a sufficient quantity of liquid from the zone of increased solids content will result in the upper level of the zone falling below tubes 30 and 31, whereupon the cell 37 re-establishes the low voltage circuit through relay 43. The relay 43 then breaks the circuit through solenoid 49 and source 45, and the core of the solenoid again drops to close valve 52.

This form of automatic control also is of great utility where the treating operation is performed intermittently. At each shut-down of the treating apparatus the suspended solids in the zone of increased solids content will settle to the bottom of the tank. The liquid in the tank will be clear and the mechanism described will prevent draining the upper part of the tank and loss of the treated liquid therein.

Figure 4:
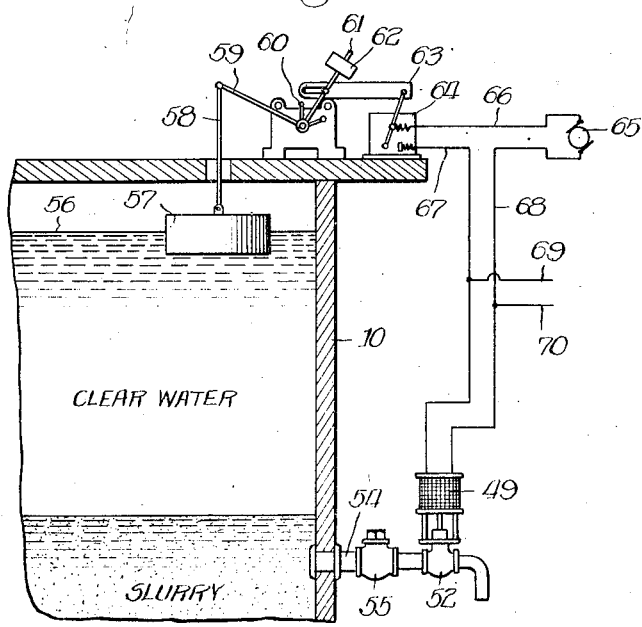
Fig. 4 is a view partly in section of means for initiating and terminating the withdrawal of suspended precipitate upon the starting and stopping of flow of liquid through the apparatus.

The embodiment of the invention shown in Fig. 4 is designed for use in connection with an intermittent softener in which the supply of water entering the softener is determined by conventional mechanism (not shown) responsive to float 57. Valve 52 controlling the blow-off of slurry also is connected to and operated by float 57. When the demand for treated liquid is lowered, the level 56 of the liquid within the tank will rise, thereby lifting the float 57. The latter has an upwardly extending rod 58 which connects to an arm 59, upon which are lugs 60 engaging a weighted arm 61. As the float rises the weight 62 on arm 61 will be shifted to the right, as shown in Fig. 4. The arm 61 engages a link 63 through a conventional slot and pin arrangement, and as the arm 61 moves to the right the link snaps off switch 64. Switch 64 is connected in series with the circuit from a suitable source 65 through lines 66, 67, solenoid 49 and line 68. When the switch 64 is in open position, the core of solenoid 49 will cause closing of the valve 52, thereby preventing the draining of slurry. If the level of liquid in tank 10 drops, float 57 will likewise drop and close switch 64, this action energizing solenoid 49 and causing the valve 52 to open to discharge solids from the zone of increased solids concentration. It will be understood that the float also opens a raw water inlet when the level drops, so that blow-off of slurry occurs only when additional water is treated and additional slurry formed. Solenoid 49 desirably is connected in parallel with lines 69 and 70, which lead to a solenoid-controlled raw water inlet valve and to motors operating chemical feeders (not shown) designed to treat the liquid entering tank 10. Rise and fall of the liquid level within tank 10 therefore will control operation of the motors by which the chemicals are fed to the liquid and of the inflow of liquid.

Where the treating process is to operate intermittently it is not necessary to stop the impeller 16. This is particularly true if the periods of shut-down are of short duration. The power consumed in operation of the impeller is of small magnitude since the head created by the impeller to provide circulation is of the order of only about a few inches. Maintaining the circulation during the period of shut-down thoroughly remixes all sludge in the treating apparatus. When treatment is resumed the upward displacement effected by the introduction of additional liquid results in the liquid being passed upwardly through an already formed concentrated suspension of solids, thereby enabling the process to be started and stopped without even a temporary loss in the production of properly treated liquid. Even when the circulation is stopped during a shut-down and the suspended particles settle or sediment to the bottom of the tank, the sedimented particles are quickly brought back into suspension upon resumption of operation by the sweeping effect of water passing out of the bottom of the circulation tube 21 and by the pick-up lines 19 which are positioned close to the bottom of the tank, thereby reforming the slurry of suspended particles which is necessary to the operation of the process.

It will be seen that changes in the procedure and apparatus described herein for purposes of illustration and explanation may be made without departing from the scope of the invention as described in the appended claims.

I claim:

1. In the softening of water by a process which includes precipitating hardness-imparting constituents therefrom, the steps which comprise maintaining a pool of slurry in the lower portion of a column of water, circulating a portion of said slurry through a mixing zone, mixing together in said mixing zone an amount of raw water, a precipitant and said circulated slurry, percolating water out of the resulting mixture upwardly through said pool of slurry, and withdrawing clear water from above said slurry.

2. In the softening of water by a process which includes precipitating hardness-imparting constituents therefrom, the steps which comprise providing a pool of concentrated slurry containing previously precipitated solids in the lower portion of a column of water, maintaining a local current in a portion only of said slurry, mixing raw water, a precipitant and slurry in said local current, percolating water from said mixture upwardly through said slurry, and withdrawing clear water from above said slurry.

3. The process of softening water, which comprises establishing and maintaining a pool of a concentrated slurry of solids of a nature similar to the solids to be precipitated from the water, circulating a portion of said slurry through a mixing zone, mixing together in said zone the circulated slurry, a precipitate-forming reagent and a quantity of raw water no greater than substantially one-half the quantity of circulated slurry, introducing the resulting mixture into an underlying portion of said pool of slurry to displace clear water therefrom, and controlling the volume of said pool by withdrawal of slurry therefrom.

4. A process for treating water to remove substances therefrom in solid particle form, which comprises maintaining a zone of concentrated slurry containing suspended particles of like nature to those to be formed, mixing water to be treated with a precipitant and with a portion of said slurry, then displacing said water upwardly through said slurry by additional water at a rate sufficiently high to prevent sedimentation of the particles contained in the slurry and sufficiently low to permit accumulation of additional suspended particles in said slurry zone, controlling the depth of said zone by withdrawal of slurry therefrom at a point near the top of the zone, and withdrawing clarified water from above said zone.

5. In a process of softening water which includes precipitation of hardness-imparting impurities therefrom, the steps which comprise establishing in a vertical column of water a pool of concentrated slurry composed of suspended particles of like nature to the solids to be precipitated from the water to be treated, mixing water to be treated with a precipitant and some of said slurry, percolating water from the resulting mixture upwardly through said slurry at a rate sufficiently high to prevent settling of the slurry particles and sufficiently low to permit particles precipitated from said water to be retained in said slurry, and withdrawing slurry from adjacent the top of said zone to provide a slow and general upward movement of particles in said slurry zone.

6. A water-softening process which includes precipitation of hardness-imparting elements from the water, comprising the steps of maintaining a pool of slurry containing solids of nature similar to those to be precipitated from the water, establishing a restricted mixing zone in said pool of slurry, quickly mixing raw water and reagents with at least about twice their volume of slurry in said mixing zone, circulating said mixture out of said mixing zone into and through a circulating zone in the lower portion of said pool, displacing the water upwardly out of said circulating zone and through the upper portion of said pool by further portions of water, and withdrawing suspended solids from said pool.

7. A water softening process, which comprises establishing and maintaining a definite pool of conditioned slurry of solids of a nature similar to the solids to be precipitated from the water, continuously circulating a quantity of said slurry, mixing with said circulated slurry a smaller quantity of raw water and a precipitate-forming reagent, introducing the resulting mixture into an underlying portion of said pool of slurry to displace clear water therefrom, and withdrawing displaced clear water from above said pool.

8. In the softening of water by the process which includes treating the water with a reagent and separation of impurities in solid form, the steps which comprise establishing a pool of a conditioned slurry of particles obtained from previously treated water in the lower portion of a vertical column of water, circulating a portion of said slurry through a mixing zone which is relatively small as compared with said pool, mixing together in said mixing zone said circulated slurry, a reagent and an amount of raw water, passing the resulting mixture back into said pool of slurry, withdrawing substantially clear water from above said pool of slurry, withdrawing slurry from said pool to control the depth thereof, and maintaining the movement of water in said pool to provide relative quiescence in the upper portion thereof and to maintain the slurry against sedimentation.

9. In the softening of water by the process which includes treating the water with a reagent to form a precipitate from the hardness-imparting compounds of the water and separating the precipitate from the treated water, the steps which comprise establishing a pool of a concentrated slurry of suspended particles obtained from previously treated water in the lower portion of a vertical column of water, withdrawing slurry from said pool, circulating the withdrawn slurry through a mixing zone, dosing the circulated slurry with a precipitant, mixing the dosed slurry with an amount of water to be treated, passing the resulting mixture back into said pool of slurry, withdrawing substantially clear water from above said pool of slurry, withdrawing slurry from said pool to control the depth thereof, and maintaining the movement of water in said pool to provide relative quiescence in the upper portion thereof and to maintain the particles in said pool against sedimentation.

10. Apparatus of the type described, comprising a tank, a collecting chamber, pick-up members communicating with said collecting chamber and having inlet openings at spaced positions in said tank, means for producing a circulatory flow of liquid from said tank through said pick-up members to said collecting chamber and into said tank, and means for adding water to be treated and chemicals to the liquid circulated through said collecting chamber.

11. Apparatus of the type described, comprising a tank, a treating chamber associated with said tank, means for delivering water to said chamber, liquid transfer conduits extending into said tank and having openings positioned in spaced relation in said tank, said transfer conduits being in communication with said chamber, means for delivering treating material to said chamber, and means for circulating liquid between said tank and said chamber and through said transfer conduits.

12. In the softening of water by the process which includes treating the water with a reagent to form a precipitate from the hardness-imparting compounds of the water and separating the precipitate from the water, the steps which include maintaining in a body of water a slurry containing suspended particles of hardness-imparting constituents separated and concentrated from previously treated water, establishing with said slurry a pattern of circulation in which the slurry is passed convergently to a mixing zone, through said mixing zone and divergently therefrom, providing currents including said circulation of slurry of sufficient intensity to maintain said particles in suspension, passing water undergoing treatment for precipitation of hardness-imparting constituents by a reagent through said mixing zone with said slurry, displacing treated water from said slurry and withdrawing from above said slurry displaced treated water clarified from slurry.

13. In the softening of water by the process which includes treating the water with a reagent to form a precipitate from the hardness-imparting compounds of the water and separating the precipitate from the water, the steps which include establishing in the lower portion of a body of water a zone containing slurry of suspended particles precipitated from previously treated water, establishing with said slurry a pattern of agitation and circulation including upward and downward flows in which portions of the slurry from different parts of said zone are passed convergently into a mixing zone, through said mixing zone and divergently therefrom, passing water undergoing treatment with a softening agent and a coagulant through said mixing zone with said slurry, said agitation and circulation being sufficiently intense and rapid to maintain said particles in suspension, displacing treated water from said slurry in a zone of relative quiescence, and withdrawing clarified water from a point spaced above said slurry.

14. In the separation of substances from water in solid form by the process which includes producing in the water a chemical reaction for the formation of solid particles from dissolved substances and removing said particles, the steps which include establishing in a body of water a zone containing a slurry of suspended particles separated and concentrated from previously treated water, establishing with said slurry a pattern of circulation in which a portion of said slurry is passed adjacent a moving stream-projecting surface and subsequently back to said zone, mixing water undergoing treatment and a precipitate-forming reactant with a major quantity of circulating slurry, maintaining the particles of slurry in suspension, removing suspended particles from the slurry to control its volume, separating treated water from the suspended slurry in a zone of relative quiescence, and withdrawing the treated water in clarified condition from above the suspended slurry.

15. In the treatment of water to remove substances therefrom in solid form, the steps which comprise establishing in a body of water a zone containing a slurry of suspended particles separated and concentrated from previously treated water, establishing with said slurry a circulation of sufficient agitative force to maintain the particles in said slurry in suspension and in which slurry from different portions of said zone are passed convergently adjacent a rotating stream-projecting surface, mixing water undergoing treatment and a precipitate-forming reactant with the slurry passing adjacent said surface, divergently distributing the mixture from adjacent said surface, and separating treated water in clarified form from above said slurry.

16. Apparatus of the type described, comprising a tank, a mixing chamber associated with said tank, liquid transfer members extending from said chamber into said tank and having openings positioned in spaced relation therein, said transfer members forming means of communication between said tank and said chamber, means including a driven mechanical stream-projecting impeller for circulating liquid between said tank and said chamber and through said transfer members, means for adding liquid and a chemical precipitant to said circulating liquid, means for withdrawing clarified liquid from said tank at a point spaced substantially above the circulated liquid, and a minor outlet substantially below said clarified liquid withdrawal means.

17. Apparatus of the type described, comprising a tank, inner and outer housings in said tank forming mixing and circulating compartments therein, a rotatably driven mechanical stream-projecting impeller operative to circulate liquid through said compartments and the lower portion only of said tank and to prevent particles in the circulated liquid from sedimenting, means for withdrawing liquid from above the lower portion of the tank, and means for withdrawing suspended solids from said tank below said last named means.

18. In a device of the type described, a tank; liquid guide means for defining a local mixing zone, a zone of liquid circulation adjacent a lower portion of the tank and a zone of relative quiescence above and communicating with said zone of circulation; means associated with said guide means and including a driven mechanical stream-projecting impeller for providing circulation of a substantial quantity of a slurry composed of water containing suspended particles collected from previously treated water convergently from said circulation zone to said mixing zone, through said mixing zone, and divergently therefrom back into said circulation zone and for providing a sufficient state of agitation to maintain the particles of said slurry in suspension in said mixing and circulation zones; means for introducing water and a particle-forming substance into the slurry circulated through said mixing zone, means for removing particles from said slurry to control the amount thereof, and means substantially above said circulation zone for withdrawing clarified water passing thereto by flow from said circulation zone through said zone of relative quiescence.

19. In a device for removing substances from water in solid particle form, which comprises a tank having a clarified water outlet in an upper portion thereof and defining the normal liquid level therein; an outer casing having a lower portion substantially spaced from said outlet and communicating with a lower portion of said tank and an upper portion extending above the liquid level established by said outlet; an inner casing communicating at an upper portion with said outer casing and at a lower portion with said tank remote from said outlet; means including a rotatably driven mechanical stream-projecting impeller positioned for circulating a slurry composed of water containing suspended solids from a lower portion of said tank convergently to and through said inner and outer casings and divergently therefrom back into a lower portion of said tank; means for adding water and a particle-forming substance to slurry circulated through said casings; and means for removing particles from said slurry to control the amount thereof.

20. In a device of the type described, a tank; liquid partitioning and flow guiding means in said tank constructed and positioned to provide in operation of the device a mixing zone for relative turbulence, a clarification zone for relative quiescence and a zone for liquid transfer having one portion thereof communicating with and adjacent said mixing zone and having another portion thereof positioned in the lower portion of the tank and communicating with and adjacent said clarification zone; means including a power driven mechanical stream projecting impeller positioned to provide in operation of the device relative turbulence in said mixing zone, circulation of liquid convergently from said transfer zone to said mixing zone, through the same and divergently therefrom back into said transfer zone; means for introducing liquid to be treated and reagent into said mixing zone; liquid outlet means communicating with said clarification zone and being sufficiently above said lower tank portion to allow for clarification therebelow; and additional outlet means communicating with said tank below said first named outlet means.

21. Apparatus of the type described, comprising a tank; housing defining a local agitating compartment, said housing being in liquid communication with a lower portion of said tank; liquid transfer means extending into said lower portion of the tank and providing additional liquid communication between said agitating compartment and said lower portion of the tank; a power driven mechanical stream-projecting impeller operative in association with said housing to agitate liquid in said agitating compartment and to circulate liquid between said agitating compartment and said lower portion of the tank through said liquid transfer means in one direction and through said first named communication in the other direction; liquid inlet means operable to supply liquid to said agitating compartment; liquid outlet means positioned above said lower portion of the tank sufficiently to provide space for a clarification zone of relative quiescence therebelow; and additional outlet means communicating with said tank below said liquid outlet means.

22. In the softening of water by the process which includes treating hard water with a softening reagent to produce a particle-forming compound from a hardness-imparting compound in the water, the steps which comprise collecting particles from a relatively large volume of previously treated water to form a pool of substantially uniformly concentrated slurry composed of water containing in suspended condition a relatively large quantity of particles of like nature to the particles to be removed from the water being treated; imparting sufficient suspensory and circulatory energy to said slurry and directing the flow thereof to effect circulation of slurry through a chemical treatment zone and back to said pool of slurry and to maintain the particles in said slurry in a state of suspension; passing hard water and a softening chemical with the slurry circulated through said chemical treating zone, the volume of said hard water being less than the volume of the slurry circulated through said chemical treating zone; removing suspended particles from said slurry to control the amount thereof; displacing treated water from the slurry in said pool and thereby clarifying said treated water from said slurry; and withdrawing the treated water clarified from said slurry from above said pool.

23. A continuous process for softening water by the formation of a calcium precipitate and clarification of the water from said precipitate, which comprises adding lime to said water; producing the formation of calcium precipitate in a stream of incoming water flowing through a turbulent mixing zone; recirculating a portion of the water containing said precipitate divergently from said mixing zone to an underlying portion of a body of water and convergently back to said mixing zone for admixture with the incoming water passing through said mixing zone; continuing said recirculation and controlling the amount of water recirculated by sufficient energy imparted to said water in addition to the energy of incoming water to form a pool of slurry composed of water physically saturated under the conditions of the process with suspended particles collected from a relatively large volume of previously treated water and having its upper portion in an underlying portion of said body of water, to maintain the particles in said slurry in suspension and to produce agitative conditions in said mixing zone; clarifying water by displacement from said pool of slurry; and withdrawing water clarified from said precipitate from above said pool of slurry.

24. In the process for removing substances from water by the formation of a precipitate and clarification of the water from said precipitate, the steps which comprise producing the formation of solid particles in a flow of incoming water passing through a turbulent mixing zone; passing slurry composed of water substantially physically saturated under the conditions of the process with suspended particles collected from a relatively large volume of previously treated water, from a body of such slurry convergently to and through said mixing zone with said incoming water; passing the resulting mixture from said mixing zone divergently back into said body of slurry; imparting substantial energy to said slurry in addition to any energy imparted thereto by the incoming water and thereby producing turbulence in said mixing zone, maintaining the particles in said slurry in suspension, and recirculating a substantial quantity of said slurry through said mixing zone; removing particles from said slurry to control the amount thereof; displacing water out of said slurry; and withdrawing water clarified from the particles in said slurry from above said body of slurry.

WALTER J. HUGHES.